Jan. 2, 1923. 1,440,700.
E. A. RUSSELL ET AL.
HEATING SYSTEM FOR RAILWAY CARS.
FILED MAR. 1, 1920. 7 SHEETS—SHEET 1.

Jan. 2, 1923.

E. A. RUSSELL ET AL.
HEATING SYSTEM FOR RAILWAY CARS.
FILED MAR. 1, 1920.

Jan. 2, 1923. 1,440,700.
E. A. RUSSELL ET AL.
HEATING SYSTEM FOR RAILWAY CARS.
FILED MAR. 1, 1920. 7 SHEETS—SHEET 3.

Jan. 2, 1923.

E. A. RUSSELL ET AL.
HEATING SYSTEM FOR RAILWAY CARS.
FILED MAR. 1, 1920.

Patented Jan. 2, 1923.

1,440,700

UNITED STATES PATENT OFFICE.

EDWARD A. RUSSELL AND HARRY G. GEISSINGER, OF CHICAGO, ILLINOIS, ASSIGNORS TO VAPOR CAR HEATING COMPANY, INC., OF CHICAGO, ILLINOIS, A CORPORATION OF NEW YORK.

HEATING SYSTEM FOR RAILWAY CARS.

Application filed March 1, 1920. Serial No. 362,339.

*To all whom it may concern:*

Be it known that we, EDWARD A. RUSSELL and HARRY G. GEISSINGER, citizens of the United States, residing at Chicago, in the county of Cook and State of Illinois, have invented certain new and useful Improvements in Heating Systems for Railway Cars, of which the following is a specification.

Our invention relates to heating systems for railway cars, and has for its primary object to provide a novel heating system comprising means for automatically governing the admission of heating medium thereto whereby one of a plurality of temperatures may be economically maintained in the car.

It is customary for the steam train pipes of passenger cars, when the cars are not in service, to be connected to a source of supply of heating medium in the railway yard, or at the terminal, to prevent the freezing of water pipes and fixtures or fittings, which may contain water. Under such conditions, it is unnecessary to maintain a relatively high temperature in the cars, though if there is no special means for reducing the admission of heating medium to the radiators, the cars are heated to the same temperature at which they are maintained when in service. This involves a large waste of fuel, since railway cars are usually out of service for a longer period than they are in service.

One of the objects of our invention is to provide novel means for controlling the admission of heating medium to the radiators of a railway car which is automatically conditioned, upon a state of connection or disconnection of the locomotive with the remainder of the train, to maintain the atmosphere of the car at one of a plurality of predetermined temperatures. The invention utilizes the circumstance that air pressure is maintained in the air signal line of the train at all times when the train is connected with the locomotive, and that the pressure in the said air line immediately disappears when the locomotive is disconnected. Our invention furthermore insures that the controlling means of the heating system will be automatically conditioned to maintain the desired normal temperature when the cars are out of service by providing the said controlling means with devices which respond to the pressure condition in the air signal line.

The invention also contemplates a controlling system capable of being manually conditioned to control the admission of heating medium to the radiators whereby the desired living temperature may be maintained in the cars in the event that the locomotive is disconnected from the train, at a terminal for example, and the cars continue to be occupied.

It is desirable that the atmosphere of a car, when occupied, be maintained at a normal living temperature, for example 70° Fahrenheit, and when unoccupied at a temperature, for example, 50° Fahrenheit, which may be economically maintained to prevent freezing of the water pipes or other fixtures of the car. If the heating system is such as to require the personal attention or manual operation of the valves to insure the desired temperature being maintained, any inattention may result in the car being overheated at times when occupied, or the temperature being maintained too low when the car is out of service. In order to insure the proper heating of the car under either of the above conditions, our invention contemplates for one of its objects to provide a heating system having novel automatic means which may be set to control the admission of heating medium to the radiator members, whereby a normal living temperature, or a much lower temperature, if desired, may be uniformly maintained in the car.

The controlling mechanism of our invention preferably comprises electrically operated devices which are normally supplied with electric currents from storage batteries or other suitable source of electric current supply. The circuits from said electric supply to the said operating devices are opened and closed by means of thermostats adapted to operate at predetermined temperatures. In order to avoid the waste of electric current when there is no supply of heating medium for the radiators, for example, when the cars are disconnected from the locomotive under such conditions as make it impractical or undesirable to connect the steam train line to another source of supply of heating medium, the electric circuit leading from the source of electric current supply to the thermostatic members is preferably controlled by means of a switch which responds to the pressure condition in the steam train line. With this arrangement the electric current is used only during the periods that the steam train line is under pressure. This device, however, is not a part of the joint invention of the present inventors and is not claimed herein.

The invention consists in the novel arrangements, constructions and combinations of parts and devices, hereinafter described and claimed for carrying out the above stated objects and such other objects as will appear from the following description.

The invention is illustrated in the accompanying drawings, wherein.

Like characters of reference designate like parts throughout the several figures of the drawings.

Our invention is particularly suitable as a vapor or low pressure steam heating system and will be described as a heating system of this type though it will be obvious that the features embodied in the invention illustrated might be used in connection with heating systems using high pressure steam or other kinds of heating medium.

Referring first to the drawings: 10 designates the steam train line of a railway passenger car and 11 a branch pipe leading from the train pipe 10 to a vapor regulator 12. The vapor regulator may be of any suitable or preferred type, the one illustrated being of the type shown in the Gold patent No. 1,077,525 dated November 4, 1913. In regulating means of this type the radiator discharge outlet is open to the atmosphere. If a quantity of steam in excess of that which is condensed in the radiator passes through the regulator chamber, a thermostat contained in the chamber will act because of the heat of the discharged medium to reduce or interrupt the admission of steam to the radiator supply pipe. This pipe is designated in the drawings at 13, and connects the vapor regulator 12 with the radiator valve designated generally at 14. The valve is normally automatically operated, as will be hereafter described, to direct the heating medium from the radiator supply pipe 13 into the inlet end 15 of the radiator coils or to shut off inflow and short circuit the steam from the supply pipe directly to the thermostat of the vapor regulator.

Figures 1, 2:
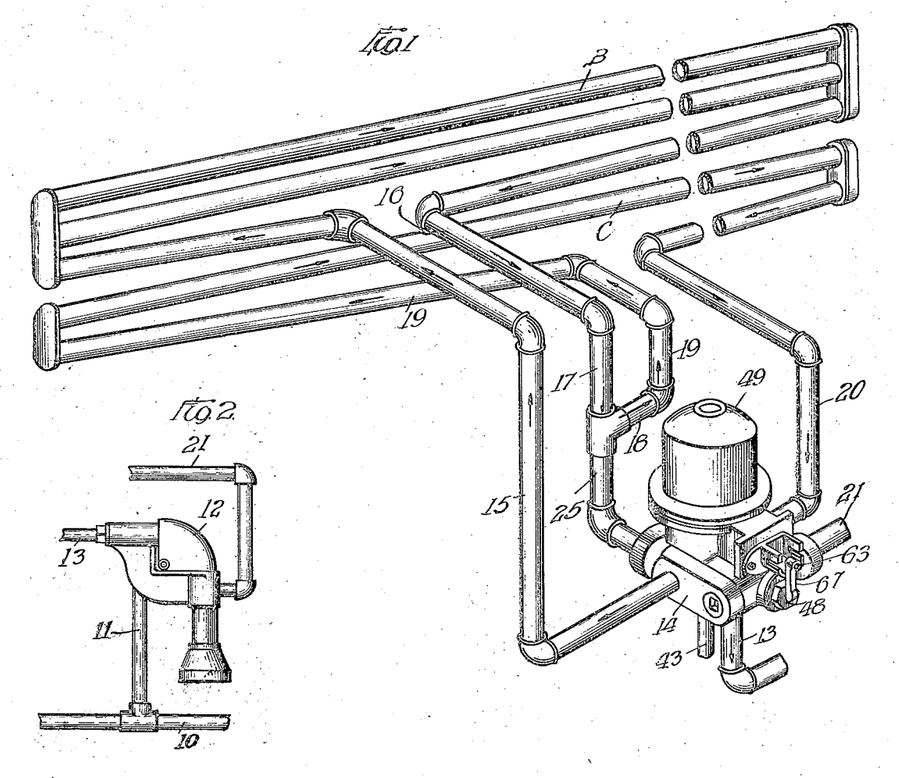
Fig. 1 is a view in perspective, illustrating one of the radiators of a railway car, together with an automatically operable valve for controlling the admission of heating medium to the radiator.
Fig. 2 is a fragmentary view in elevation illustrating a preferred form of vapor regulator employed in conection with the heating system shown in Fig. 1 together with the piping connections.

In Fig. 1 we have shown the radiators consisting of two sections, B, C, the return pipe 16 of the former being connected by means of branch pipes 17, 18, with the inlet end 19 of the latter section. The heating medium entering pipe 15 circulates through the coils of section B, and then passes into the coils of section C of the radiator, returning to the valve 14 through pipe 20, and thence to the vapor regulator through radiator valve 14 and the discharge pipe 21.

The radiator valve 14 above referred to consists, preferably, of a casing provided with a plurality of chambers as follows: Chamber 22, communicating with the supply pipe 13, chamber 23 communicating with the inlet pipe 15 of the radiator, chamber 24 communicating with a drain pipe 25 leading from the discharge end of section B and the inlet of section C (Fig. 1), chamber 26 communicating with the radiator return pipe 20, chamber 27 communicating with the discharge pipe 21, and a valve chamber 28.

A bushing 29 is positioned in the valve chamber and is formed along one side with ports 30, 31 and 32, communicating with the chambers 22, 23 and 24, respectively, and is formed along the opposite side with ports 33, 34, communicating with the chamber 26. A valve 35 is slidably operable in the bushing 29, and is adapted to normally stand in its open position whereby steam may flow through the radiators. This arrangement insures against possibility of water freezing in the pipes or other fixtures of the car in the event that the automatic control mechanism, hereinafter described, should fail to operate properly.

Figures 3, 5:
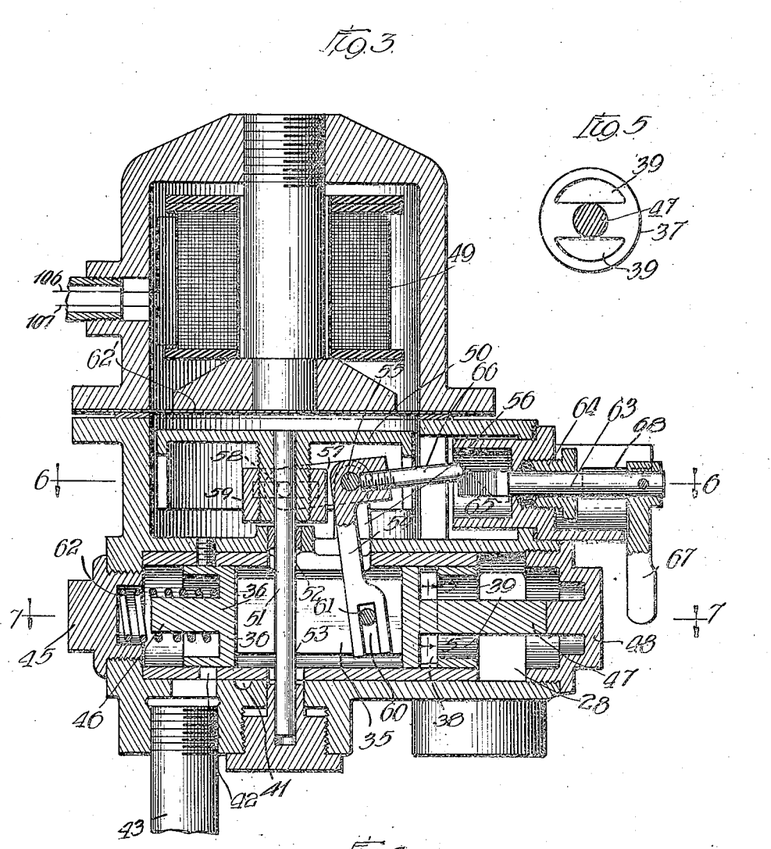
Fig. 3 is a vertical section taken through the valve structure and operating motor shown in Fig. 1.
Fig. 5 is a cross-section taken on line 5—5 of Fig. 3.
Figure 4:
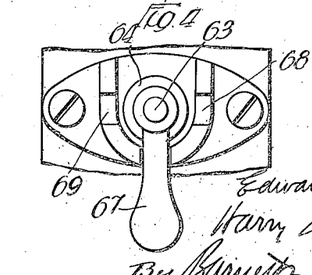
Fig. 4 is a fragmentary view of a portion of the valve casing showing a handle with which the valve may be manually operated when desired and means for supporting the handle in operative position.
Figure 6:
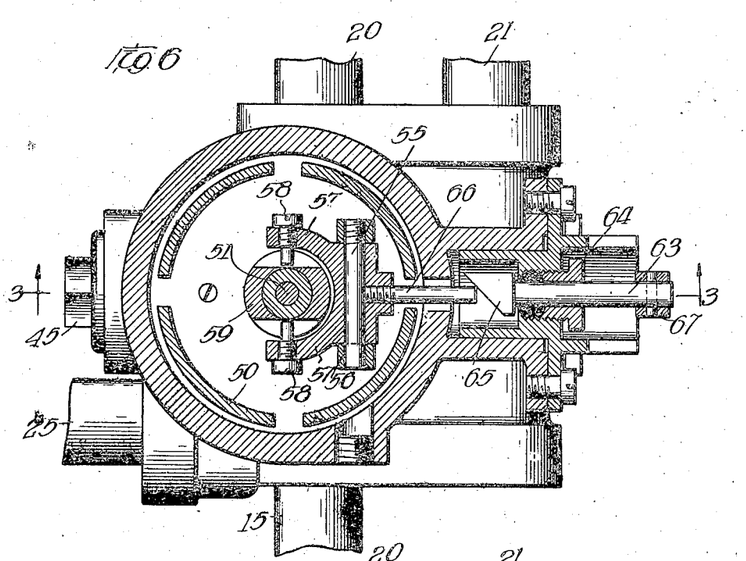
Figs. 6 and 7 are sectional plan views taken on lines 6—6 and 7—7, respectively, of Fig. 2.
Figure 7:
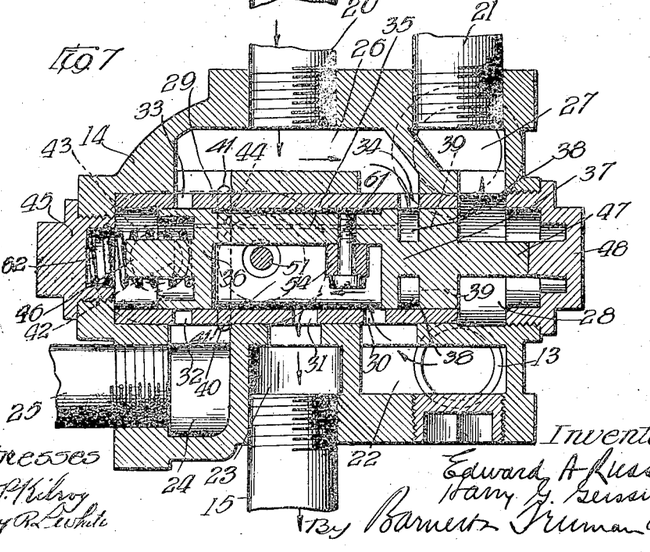

The valve 35 is formed with a head 36 adapted, when the valve is in its open position at one end as shown in Fig. 7, to close the ports 32, 33, and at its opposite end with a head 37 formed with an annular recess 38 adapted when the valve is in its open position to register with the port 34. The other portion of the valve head 37 is formed with passageways 39, 39 (Figs. 3, 5, and 7) which establish communication between the recess 38 of the valve head and the chambers 27 28 of the valve casing.

When the valve 35 is in its open position, as shown in Fig. 7, the heating medium entering the chamber 22 from the supply pipe 13 passes through the port 30 into the space 40 between the heads 36, 37, of the valve; then through port 31 into chamber 23 and inlet pipe 15 of section B of the radiator; thence through pipes 16, 17, 18 and 19 to the inlet end of section C of the radiator, and returns through pipe 20 to chamber 26 of the radiator valve; thence through port 34 into the recess 38, through passageways 39, 39 to the chamber 27, and discharge pipe 21 to the thermostat chamber of the vapor regulator 12.

Figure 8:
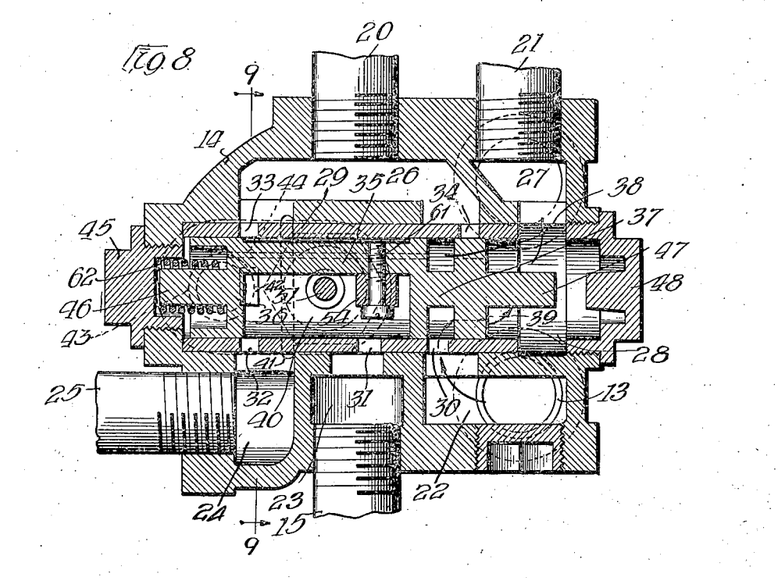
Fig. 8 is a sectional plan view similar to Fig. 7 showing the valve in its closed position whereby the heating medium is short circuited through the valve casing and directed to the vapor regulator.
Figure 9:
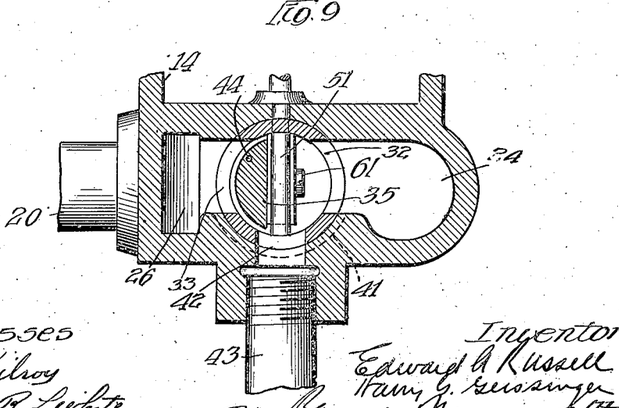
Fig. 9 is a fragmentary vertical section taken on line 9—9 of Fig. 8.
Figure 10:
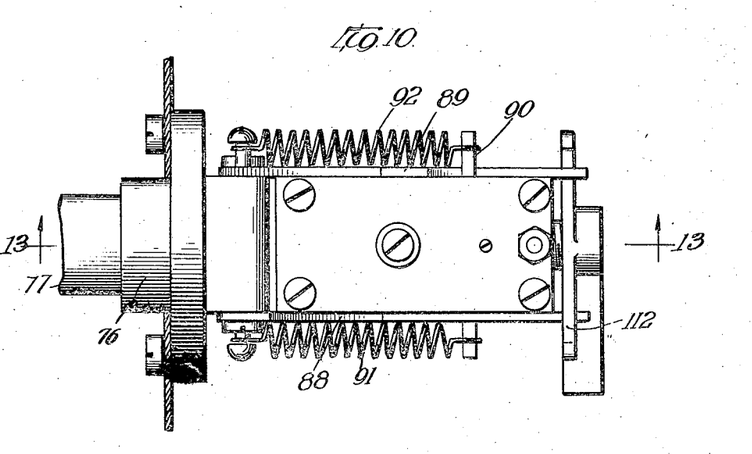
Fig. 10 is a plan view of a selector switch to put one of a plurality of thermostats in the car in control of the heating system.
Figure 11:
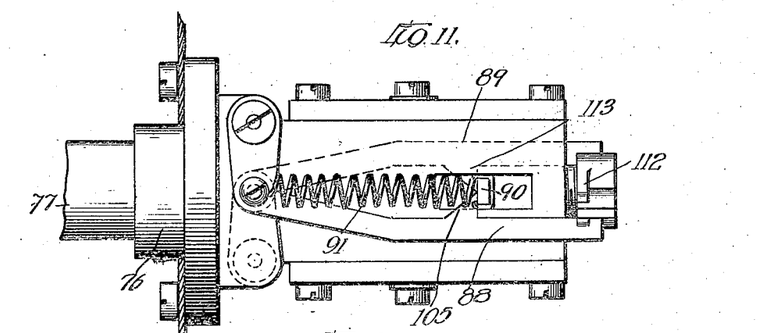
Fig. 11 is a side view in elevation of the selector switch.
Figure 12:
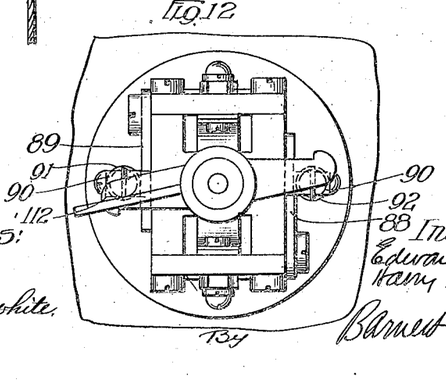
Fig. 12 is a view in elevation of one end of the selector switch.

The radiator is thoroughly drained of all water of condensation without requiring the water to be forced through all of the coils of the radiator. Assuming that steam is flowing into the radiator the condensation from the return end of section B drains out through pipe 25 to the chamber 24 of the radiator valve and thence through a duct 41 extending under the lower portion of the bushing 29, and empties into the chamber 26 of the valve casing from which it is discharged, together with the condensation from the return end of section C, through port 34, recess 38, and passages 39, 39, into chamber 27, and thence through discharge pipe 21 to the vapor regulator 12. When the valve 35 is in its closed position, as shown in Fig. 8 of the drawings, the recess 38 of the head 37 registers with the port 30, the port 34 on the opposite side being closed. In this position the valve 35 directs the incoming steam immediately to the discharge pipe 21 and vapor regulator 12 and uncovers ports 32, 33, and a drain port 42 formed on the underside of the bushing 29, thus permitting condensation from the radiator to discharge through a drip pipe 43 leading from port 42 (Figs. 3, 7, 8 and 9). The valve is provided with a vent 44 extending from end to end thereof so as to prevent the formation of a closed air pocket between the head 36 of the valve and the end cap 45 of the radiator valve casing. The movement of the valve is limited by means of abutments 46, 47, on opposite ends of the valve adapted to engage the closure caps 45, 48, respectively, when the valve is opened and closed. The valve 35 is automatically closed preferably by means of an electro-magnet 49 which, when energized, attracts its armature 50 which is operatively connected with the valve 35. The armature 50 is supported on a rod 51, vertically slidable in bearings 52, 53 and its said operative connection with the valve 35 consists of a bell-crank 54 pivotally supported, at 55 between lugs 56 and is connected at its upper end by means of arms 57, 57, and studs 58, to a slotted member 59, carried by the armature 50. The lower end of the bell-crank 54 is bifurcated, as indicated at 60, and fits over a stud 61 carried by the valve 35. With this connection the valve 35 is moved from its normally open position (Figs. 3 and 7) to its closed position shown in Fig. 8, when the electro-magnet 49 is energized. When the electro-magnet is deenergized the weight of the armature 50 is sufficient to return the valve 35 to its normally open position. The return of the valve to its open opsition is also assisted by a coiled spring 62 surrounding the abutment 46 of the valve and seating against the inner face of the closure cap 45. This spring also serves as a cushion for the valve 35 when it is moved from its open position. Preferably a disc 62' of non-magnetic metal is interposed between the pole of the magnet and the armature 50 to prevent the adhesion of the armature to the pole piece likely to occur through residual magnetism if these parts come into direct contact.

The radiator valve is preferably provided with means which may be manually operated to open or close the valve 35 independently of the magnetic coil 49. This means preferably consists of a cam member 63 revoluble and longitudinally slidable in a packing gland 64 formed on one side of the valve casing. The inner end of the cam member 63 is provided with a cam 65 adapted to engage an arm 66 of the bell-crank member 54 so as to rock the bell-crank in a manner to move the valve 35 to the desired position. The outer end of the cam member 63 is provided with an operating handle 67. When it is desired to move the valve from one position to another manually, for example, from its open position shown in Figs. 3 and 7, to its closed position, shown in Fig. 8, the cam member 63 is given one-quarter turn until the cam 65 thereof is in the dotted line position shown in Fig. 3; in which position the handle 67 will enter the slot 68. The cam member is then forced inwardly whereby the inclined face 65 thereof engages the outer end of the arm 66 and rocks the bell-crank 54. When it is desired to manually return the valve 35 to its open position, the arm 67 is moved to a position to register with a slot 69 opposite slot 68 and the cam member forced inwardly in the same manner as above described.

We do not claim herein the construction of the radiator and its controlling valve as these devices form the subject matter of a divisional application Serial No. 486,481 filed July 21, 1921.

The automatic control for the radiator valve comprises a "high temperature" thermostat 71 adapted to move away from its contact member 72 to close a circuit through the magnetic coil 49 when the temperature in the car reaches a predetermined point, for example, 70° Fahrenheit, a "low temperature" thermostat 73, adapted to move away from its contact member 74 to close a circuit through the radiator valve magnet when the temperature of the car rises above 50° Fahrenheit, and a selector switch, designated generally by 75, which is in circuit with the high temperature thermostat. The selector switch above referred to preferably consists of a cylinder 76 communicating with a branch pipe 77 of the air signal train line, and a longitudinally movable piston element 78 adapted to respond to the pressure in the air signal line. The outer end of the piston rod 80 is supported in a suitable bearing 81 and carries contact elements 82—83 adapted to close the circuit through spring contact elements 84—85, connected with wires 109—110, respectively, when the piston element 78 is in its extreme forward or extreme rearward position. When the car is disconnected from the locomotive, and there is no substantial pressure in the air signal line 77, the selector switch is held in a neutral position; that is, a position in which the spring contact elements 84—85, stand intermediate the contact members 82—83. This position is maintained by means of angular shaped latch bars 88, 89 pivoted at one end so that their free ends will engage a cross arm 90 carried by the piston rod 80. Springs 91—92 are connected to the latch members and to opposite ends of the cross arm 90 so as to normally hold the cross arm in engagement with the latch members when the car is disconnected from the locomotive. When the car is connected to the locomotive air pressure is established in the train signal pipe 77 and moves the piston member 78 to the right of Fig. 13 closing the electrical connection between the spring contacts 84—85 and contact 82 thereby putting the "high temperature" thermostat 71 in control of the heating system.

Figure 16:
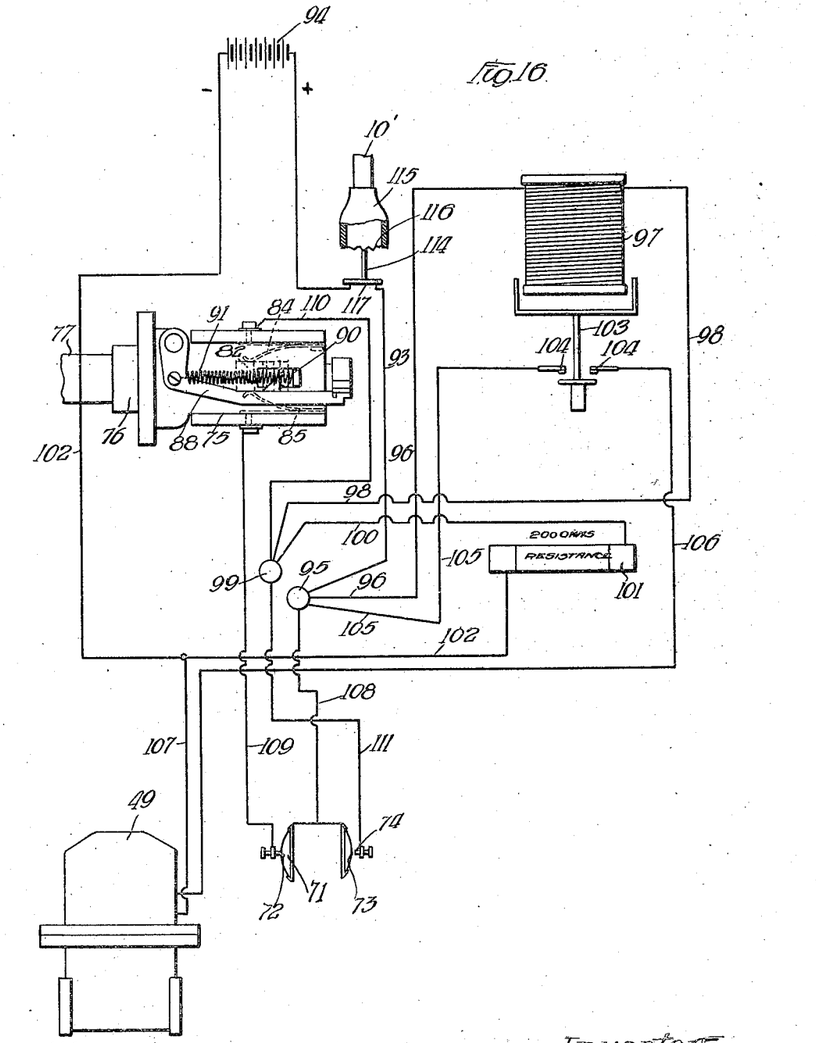
Fig. 16 is a diagram illustrating a preferred wiring system for controlling the operation of the radiator valve shown in Figs. 1 to 9 inclusive; the radiator members being omitted from this figure.

The diagram shown in Fig. 16 illustrates the various elements in the positions which they assume when the locomotive is connected with the train the car temperature above 50° F. and below 70° F., the radiator valve open to admit steam to the radiator and the high temperature thermostat 71 in control and closing its circuit. This circuit is as follows: battery 94, conductor 93, binding post 95, conductor 108, thermostat 71, contact 72, conductor 109, and brush 84, contact 82 and brush 85 of the selector switch, conductor 110, binding post 99, conductor 100, resistance 101, and conductor 102 to battery. As soon as the temperature in the car rises to a predetermined point the contact 72 of the high temperature thermostat 71 is opened, thereby establishing a circuit through the relay 97 as follows: wire 93 leading from a source of electric current supply 94 to a binding post 95, then through wires 96, relay magnet 97, wire 98 to binding post 99, then through wire 100, resistance coil 101 and negative line wire 102. The relay circuit is closed whether the circuit through the thermostat is closed or open but with the thermostat circuit closed the resistance through the relay being greater than that of the thermostat, enough current will not flow through the relay circuit to energize the relay. The resistance 101 cuts down the current flow through the thermostat and relay circuits preventing sparking at the thermostat, when its current is broken, and possible injury to the relay when the valve motor is energized, as hereinafter set forth. When the relay is energized it attracts the armature 103 and closes contact 104—104 of a shunt circuit through the radiator valve coil 49. This shunt circuit consists of wire 105 leading from binding post 95, wire 106, leading from contacts 104 to the coil 49 and wire 107 leading from said magnet 49 and connecting with the negative line wire 102.

As soon as the temperature of the car drops to a point below the normal living temperature for which the high temperature thermostat is set to operate, the thermostat closes its circuit (the first circuit above described), relay 97 is deenergized and the circuit through the magnet 49 broken, allowing spring 62 and the weight of the armature 50 to open the radiator valve.

When the pressure in the train signal pipe 77 is reduced, for example, as by disconnecting the locomotive from the train, the springs 91—92 return the contacts 82—84 and 85 of the selector switch to their neutral position thereby breaking the circuit through the high temperature thermostat and putting the "low temperature" thermostat in control of the heating system; the contact 74 of which is normally open at a temperature of 50° Fahrenheit and closed below said point. As soon as the temperature of the car falls to the predetermined point at which the "low temperature" thermostat 73 is set to close its circuit at contact 74, the valve magnet 49 is deenergized and the valve 35 opened to permit the admission of heating medium to enter the radiator. The circuit through the low temperature thermostat is as follows: wire 93, binding post 95, wire 108, contact 74, wire 111, binding post 99, wire 100, resistance coil 101, and negative line wire 102. As soon as the temperature again rises to the point at which the low temperature thermostat circuit is broken at contact 74 and the relay 97 is energized, the current passes through the relay circuit as previously described. The relay then closes the shunt circuit as before given through the magnet 49 of the radiator valve.

Figure 13:
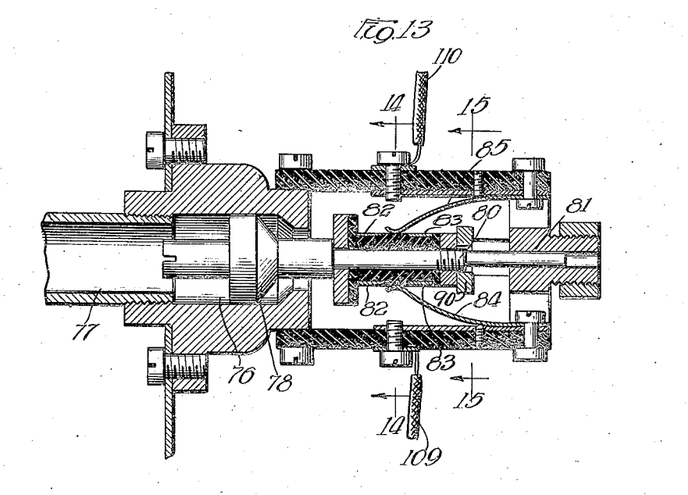
Fig. 13 is a vertical sectional view of the switch taken on line 13—13 of Fig. 10.
Figure 14:
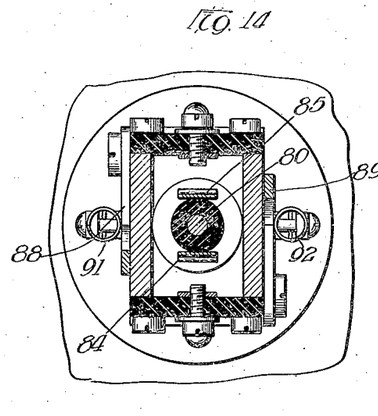
Figs. 14 and 15 are cross-sectional views taken on lines 14—14 and 15—15, respectively, of Fig 13.
Figure 15:
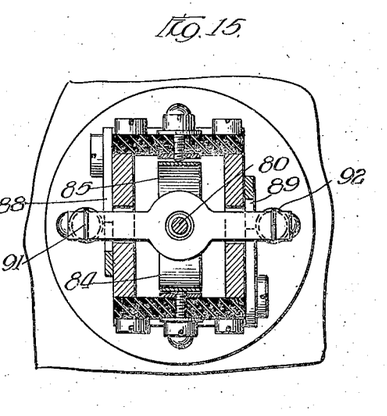

If conditions are such as to make it desirable to maintain the "high temperature" control during a period when the locomotive is disconnected from the cars, for example, at a terminal when the cars are occupied by passengers, the selector switch 75 may be released from its normally neutral position, as shown in Fig. 13 to close a circuit through the contacts 84, 83, 85 and thereby put the "high temperature" thermostat in control of the system. This result is accomplished preferably by means of a pivoted member 112 which may be rocked so as to release the latches 88, 89 from their engagement with the cross arm 90, thereby permitting the springs 91, 92 to force the piston 78 and contact 83 to the extreme inner position, thereby closing the contacts 84, 83, 85, whereupon the opening or closing of the high temperature thermostat contact 72 will close or open a circuit through valve 49 as above described.

Assuming that the selector switch has been manually set as above described to put the high temperature thermostat in control, as soon as pressure has been established in the signal line the switch will be returned to a position bringing brushes 84, 85 against contact 82, the arm 90 riding over the inclined surfaces 113 of the latch members and forcing said members apart sufficiently to permit it to pass to its normal position. This reestablishes the automatic control.

When the electric current supply consists of storage batteries such, for example, as indicated at 94, we prefer to use switch mechanism 114 which is responsive to the pressure condition of the steam train line, whereby the electric circuit is opened when the steam train line is disconnected from a source of steam supply. Under such conditions, for example when the locomotive is disconnected from the cars at some point where a stationary source of steam supply is unavailable or, for example, when the cars are in the railway shops for repairs, the electric current through the controlling system is broken. The switch mechanism 114 consists preferably of a fitting 115 connected to a branch pipe 10' of the steam train pipe 10 and is provided with a diaphragm 116 to which is connected a switch 117 adapted to open and close communication between the wire 93 and the positive side of the source of the electric current supply.

While we have described our invention in certain preferred embodiments, it will be obvious that further modifications might be made without departure from the spirit thereof. We, therefore, do not wish to limit ourselves to the specific features illustrated except in so far as specific limitations may appear in the appended claims.

We claim:

1. In a heating system for a railway car, the combination with a source of supply of heating medium, a radiator, and a radiator valve of an electrically energized device adapted to actuate said valve, an electrically controlled system for automatically controlling said valve actuating device comprising an electric circuit, a relay in said circuit, a plurality of thermostats to control the energization of said relay, a second circuit adapted to be opened and closed through said valve actuating device by the operation of said relay, and a pressure actuated switch to selectively put one of said thermostats in control of said electrically controlled system.

2. In a heating system for a railway car, the combination with the air and steam train lines of the car, a radiator, a radiator valve, and an electrically energized device to actuate said valve, of an electric control system for automatically controlling the valve actuating device comprising an electric circuit, a relay in said circuit, a plurality of thermostats which separately open and close a circuit through said relay, a circuit closed by the energization of said relay, and a pressure actuated switch normally in its neutral position during the absence of pressure in the said air line and which responds to the normal pressure in said line when the locomotive is coupled with the car to shift the control of said electric control system from one of said thermostats to another.

3. In a heating system for a railway car, the combination with the air and steam train lines of the car, a radiator, a radiator valve, and an electrically energized device adapted to actuate said valve, of an electric control system for automatically controlling the valve actuating device comprising an electric circuit, a relay in said circuit, a plurality of thermostats which separately open and close a circuit through said relay, circuits opened and closed by the energization and de-energization of said relay, and a pressure actuated switch normally in its neutral position during the absence of pressure in the air line which responds to the pressure conditions in said line when the locomotive is coupled with the car to shift the control of said electric control system from one of said thermostats to the other.

4. In a heating system for a railway car, the combination with the air line of the car, of a radiator, an automatically operable radiator valve, means for controlling the operation of said valve comprising an electric circuit, a high temperature thermostat, a low temperature thermostat, and an electrically operable switch responsive to the pressure condition in the air line to selectively determine which of said thermostats is to control said system comprising a piston spring contacts and, a switch member carried by said piston which in one position provides an electrical connection between the spring contacts and in another position breaks said connection.

5. In a heating system for a railway car, the combination with the air line of the car, of a radiator, an automatically operable radiator valve, means for controlling the operation of said valve comprising an electric circuit, a high temperature thermostat, a low temperature thermostat, and an automatically operable switch responsive to the pressure condition in the air line to selectively determine which of said thermostats is to control the system comprising a pair of spring contacts a cylinder communicating with the air line, a switch member carried by said piston and arranged so as in one position, to provide an electric connection between the spring contacts and in another position to break said connection, and a latch device to hold said switch member in a neutral position during the absence of pressure in the air line.

6. In a heating system for a railway car, the combination with the air line of the car, of a radiator, an automatically operable radiator valve, means for controlling the operation of said valve comprising an electric circuit, a high temperature thermostat, a low temperature thermostat, and an automatically operable switch, latch mechanism to hold said switch in its neutral position, means for manually releasing said switch from its neutral position whereby a circuit is closed through the high temperature thermostat, and means for automatically returning said switch device to its neutral position comprising a piston member actuated upon the increase of pressure in the said air line.

7. In a heating system for a railway car, the combination with the air line of the car, of a radiator, an automatically operable radiator valve, means for controlling the operation of said valve comprising an electric circuit, a high temperature thermostat, a low temperature thermostat, and an automatically operable switch comprising a pair of spring contacts, spaced contact members movably supported on opposite sides of said spring contact members, latch mechanism to normally hold said movable contacts in their neutral position during the absence of air pressure in said air line, means for releasing said movable contacts from their neutral position whereby they may be moved to their extreme inner position to close a contact between the spring contact members and means for returning said movable contacts to their extreme outer position to close a connection between said spring contacts comprising a cylinder communicating with the air line, and a piston slidably supported in said cylinder and operably connected with said movable contacts.

8. In a heatng system for a railway car, the combination with the air line of the car, of a radiator, a radiator valve, and means for automatically controlling the operation of said radiator valve comprising a source of electric current, a relay, a high temperature thermostat, a low temperature thermostat, and a selective switch responsive to the pressure condition in said air line to close a contact during the absence of pressure in said air line so as to establish a circuit through said low temperature thermostat and to close another contact during the presence of pressure in said air line to close a circuit through said high temperature thermostat; said thermostats being adapted to open and close an electric circuit to said relay.

9. In a heating system for a railway car, the combination with the air line of the car, of a radiator, a radiator valve, means comprising two electromagnetic members adapted to be alternately energized to open and close said valve, switches which are opened and closed alternately by the movement of said valve, and means for alternately energizing said electromagnets comprising a source of electric current, a relay, a high temperature thermostat, a low temperature thermostat, and a selective switch arranged so as in one position, to close a circuit through the high temperature thermostat and in another position to close the circuit through the low temperature thermostat; said thermostats being arranged to open and close a circuit through the circuit relay whereby the energization and de-energization of said relay alternately opens and closes circuits through said electromagnetic members.

10. In combination with the radiator, source of supply of heating medium and control valve of a railway car heating system, an electrically actuated motor for operating the valve, a relay for opening and closing the motor circuit, a circuit breaking thermostat in the car for energizing and deenergizing the relay, said motor, relay and thermostat circuits having common leads, and a resistance in circuit with said thermostat and relay.

11. In combination with the radiator, source of supply of heating medium and control valve of a railway car heating system, a circuit breaking thermostat in the car, an electrically actuated motor for operating the control valve, the circuit of which motor is in parallel with the thermostat circuit, and a relay for opening and closing the motor circuit arranged in a closed shunt from the thermostat circuit, the current requirement of the relay being such that it is energized only when the thermostat circuit is broken.

12. In combination with the radiator, source of supply of heating medium and control valve of a railway car heating system, a circuit breaking thermostat in the car, an electrically actuated motor for operating the control valve, the circuit of which motor is in parallel with the thermostat circuit, a relay for opening and closing the motor circuit arranged in a closed shunt from the thermostat circuit, the current requirement of the relay being such that it is energized only when the thermostat circuit is broken, and a resistance which is in circuit with the relay and thermostat and not in the motor circuit.

13. In combination with the radiator, source of supply of heating medium and control valve of a railway car heating system, an electric motor for operating the valve, circuit breaking thermostats which function at different temperatures arranged in circuits in parallel with the motor circuit, a selector switch in circuit with one of said thermostats, and a relay arranged in a shunt from the thermostat circuits, the current requirement of which is such that it is energized only when the thermostat circuits are broken.

14. In combination with the radiator, source of supply of heating medium and control valve of a railway car heating system, an electric motor for operating the valve, circuit breaking thermostats which function at different temperatures arranged in circuits in parallel with the motor circuit, a selector switch in circuit with one of said thermostats, a relay arranged in a shunt from the thermostat circuits, the current requirement of which is such that it is energized only when the thermostat circuits are broken, and a resistance which is in circuit with the relay and thermostats but not in the motor circuit.

15. In a heating system for a railway car, the combination of a radiator having a valve and electrically controlled means for controlling the operation of said valve comprising a circuit breaking thermostat and, in parallel therewith, a relay the current requirement of which is such that it is energized only when the thermostat circuit is broken.

16. In a heating system for a railway car, the combination of a radiator having a valve, a spring for moving the valve in one direction, an electric motor for moving the valve in the opposite direction, and means for controlling the actuation of said motor comprising a circuit breaking thermostat and, in parallel therewith, a relay the current requirement of which is such that it is energized only when the thermostat circuit is broken.

17. In combination with the steam and air train pipes of a railway car, a radiator having a valve and electrically controlled mechanism for controlling the operation of said valve comprising a circuit breaking thermostat, a relay in parallel therewith the current requirement of which is such that it is energized only when the thermostat circuit is broken, and a pressure operated circuit breaker in the thermostat circuit operated through pressure changes in said air train pipe.

18. In combination with the steam and air train pipes of a railway car, a radiator having a valve and mechanism for controlling the operation of said valve comprising two circuit breaking thermostats functioning at different temperatures, a relay in parallel with said thermostats the current requirement of which is such that it is energized only when the thermostat circuits are broken, and a pressure operated circuit breaker in the circuit of one of said thermostats operated through pressure changes in said air train pipe.

19. In a heating system for a railway car, the combination of a radiator having a valve and electrically controlled means for controlling the operation of said valve comprising a circuit breaking thermostat, a relay in parallel therewith, the current requirement of which is such that it is energized only when the thermostat circuit is broken, and a pressure operated circuit breaker in the circuit of said thermostat.

20. In a heating system for a railway car, the combination of a radiator having a valve and means for controlling the operation of said valve comprising two circuit breaking thermostats functioning at different temperatures, a relay in parallel with said thermostats the current requirement of which is such that it is energized only when the thermostat circuits are broken, and a pressure operated circuit breaker in the circuit of one of said thermostats.

21. In combination with the steam and air train pipes of a railway car, a radiator having a valve and mechanism for controlling the operation of said valve comprising two thermostats which function one at a higher temperature than the other, and a circuit breaker comprising a member which in one position puts the high temperature thermostat in control of the system, which is moved by air pressure in the air train pipe to put the low temperature thermostat in control, and which, in the absence of air pressure in said air train pipe, is manually movable to a third position to put the high temperature thermostat in control.

22. In combination with the steam and air train pipes of a railway car, a radiator having a valve and mechanism for controlling the operation of said valve comprising two thermostats which function one at a higher temperature than the other, a circuit breaker comprising a member which in one position puts the high tempeature thermostat in control of the system which is moved by air pressure in the air train pipe to put the low temperature thermostat in control and which, in the absence of air pressure in said air train pipe, is manually movable to a third position to put the high temperature thermostat in control, and means whereby on reappearance of air pressure in the air train line said member is moved from its third position to its first position.

EDWARD A. RUSSELL.
HARRY G. GEISSINGER.

Certificate of Correction.

It is hereby certified that in Letters Patent No. 1,440,700, granted January 2, 1923, upon the application of Edward A. Russell and Harry G. Geissinger, of Chicago, Illinois, for an improvement in "Heating Systems for Railway Cars," errors appear in the printed specification requiring correction as follows: Page 6, line 17, claim 4, after the word "piston" insert a comma, and line 18, after the word "and" strike out the comma; same page, line 37, claim 5, and line 115, claim 9, before the word "to" strike out the comma; page 7, lines 64, 84, and 109, claims 15, 17, and 19, for the word "controlled" read *actuated;* and that the said Letters Patent should be read with these corrections therein that the same may conform to the record of the case in the Patent Office.

Signed and sealed this 27th day of February, A. D., 1923.

[SEAL.]

KARL FENNING,
*Acting Commissioner of Patents.*